INVENTOR
Everett P. Larsh
BY William R. Jacox
HIS ATTORNEY

May 24, 1960 E. P. LARSH 2,937,613
BALANCING APPARATUS
Filed Nov. 20, 1957 3 Sheets-Sheet 3
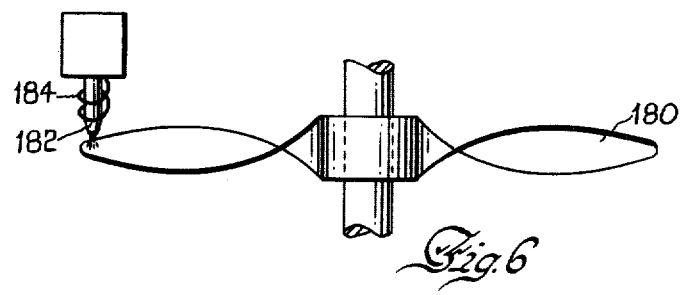
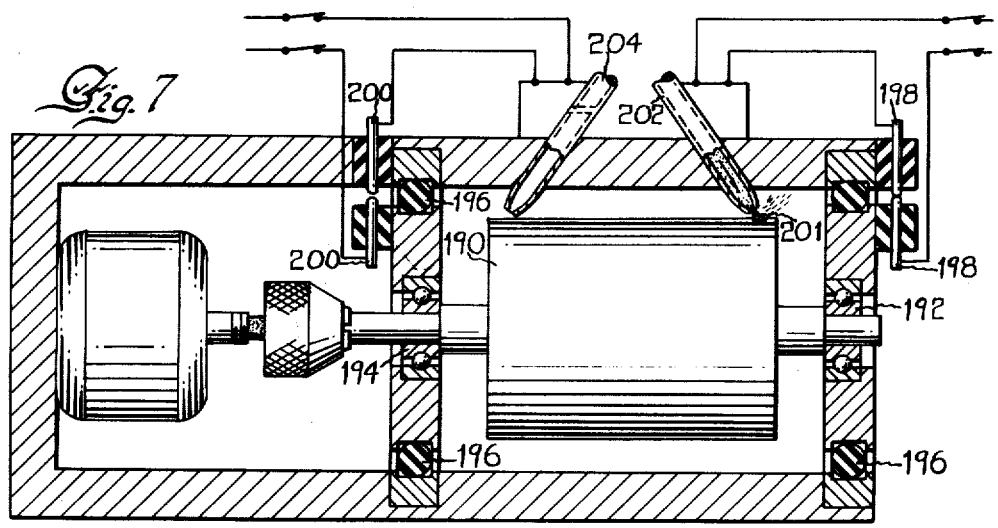
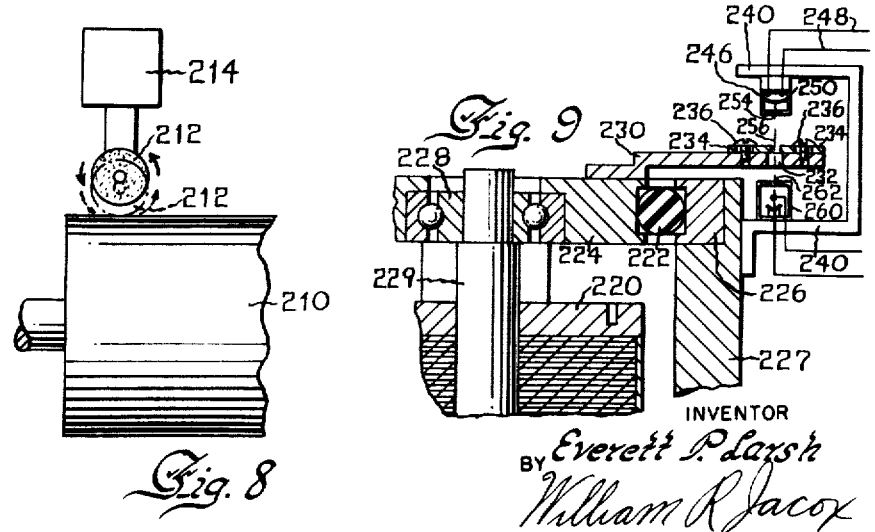
INVENTOR
Everett P. Larsh
BY William R. Jacox
HIS ATTORNEY

United States Patent Office 2,937,613
Patented May 24, 1960

2,937,613

BALANCING APPARATUS

Everett P. Larsh, 124 E. Monument Ave., Dayton 2, Ohio

Filed Nov. 20, 1957, Ser. No. 697,586

21 Claims. (Cl. 118—8)

This invention relates to balancing apparatus. The invention relates more particularly to automatically operable balancing apparatus which provides dynamic balance to a rotatable member during rotation of the rotatable member.

In the past it has been customary in the balancing of a rotatable member to use equipment or apparatus which determines the magnitude of unbalance and which also determines the location of the portion or portions of the rotating member which require weight change for improving the balance of the member. Such equipment has, of necessity, been rather involved and costly. Furthermore, with the use of such equipment it has been necessary to stop the rotating member and to apply or remove weight material in accordance with indications obtained while the member was rotating. Thus, in the past, balancing apparatus has only indicated the portions or portion of a rotating member which required weight correction. The actual weight correction has been carried out only with the member in a static condition. Obviously, a procedure of this type may be very time consuming, often requiring frequent starting and stopping of the rotating member. Furthermore, such a procedure requires manual operation in the weight changing process. Thus, such procedures are objectionable.

An object of this invention is to provide balancing apparatus which is capable of automatically balancing a rotating member so that no manual operation is required. Such a machine thus may be applied to an automatically operating production system.

Another object of this invention is to provide balancing apparatus which is capable of completely balancing a rotatable member to any desired degree of balance during rotation of the rotatable member.

Another object of this invention is to provide a dynamic balancing machine which eliminates the need for an instrument which directly locates a portion requiring weight correction.

Another object of this invention is to provide a dynamic balancing machine which eliminates the need for any instrument which measures the magnitude of the unbalanced condition.

Another object of this invention is to provide an apparatus which corrects an unbalance of a rotatable member during rotation thereof and which has means by which the rate of correction may be controlled.

Another object of this invention is to provide such an apparatus which has means by which the degree of balance obtained is easily and readily adjusted.

Another object of this invention is to provide an automatic balancing machine which has a minimum number of parts and has extreme simplicity.

Another object of this invention is to provide such an automatically operating balancing apparatus which is capable of providing dynamic balance to a rotating member which may be of any size or shape.

Another object of this invention is to provide an automatic balancing machine which is capable of balancing a rotating member which is revolving at any rate.

Another object of this invention is to provide a balancing machine which is capable of balancing any rotatable member by adding weight thereto or by subtracting weight therefrom during rotation thereof for balancing thereof.

Another object of this invention is to provide a balancing machine which is capable of providing dynamic balance to a rotating member by the use of any one of several types of weight changing devices or instruments.

Other objects and advantages reside in the construction of parts, the combination thereof, the method of manufacture, and the mode of operation, as will become more apparent from the following description.

In the drawings,

Figure 6 shows a portion of a balancing apparatus of this invention as applied to a fan or propeller type of rotor member for the balancing thereof.

Figure 7 is a schematic view, with parts shown in section, showing another modification of a balancing apparatus of this invention.

Figure 8 is a fragmentary view showing another modification of a portion of a balancing apparatus of this invention.

Figure 9 is a fragmentary view, with parts shown in section, showing a modification of another portion of a balancing apparatus of this invention.

Figure 1:
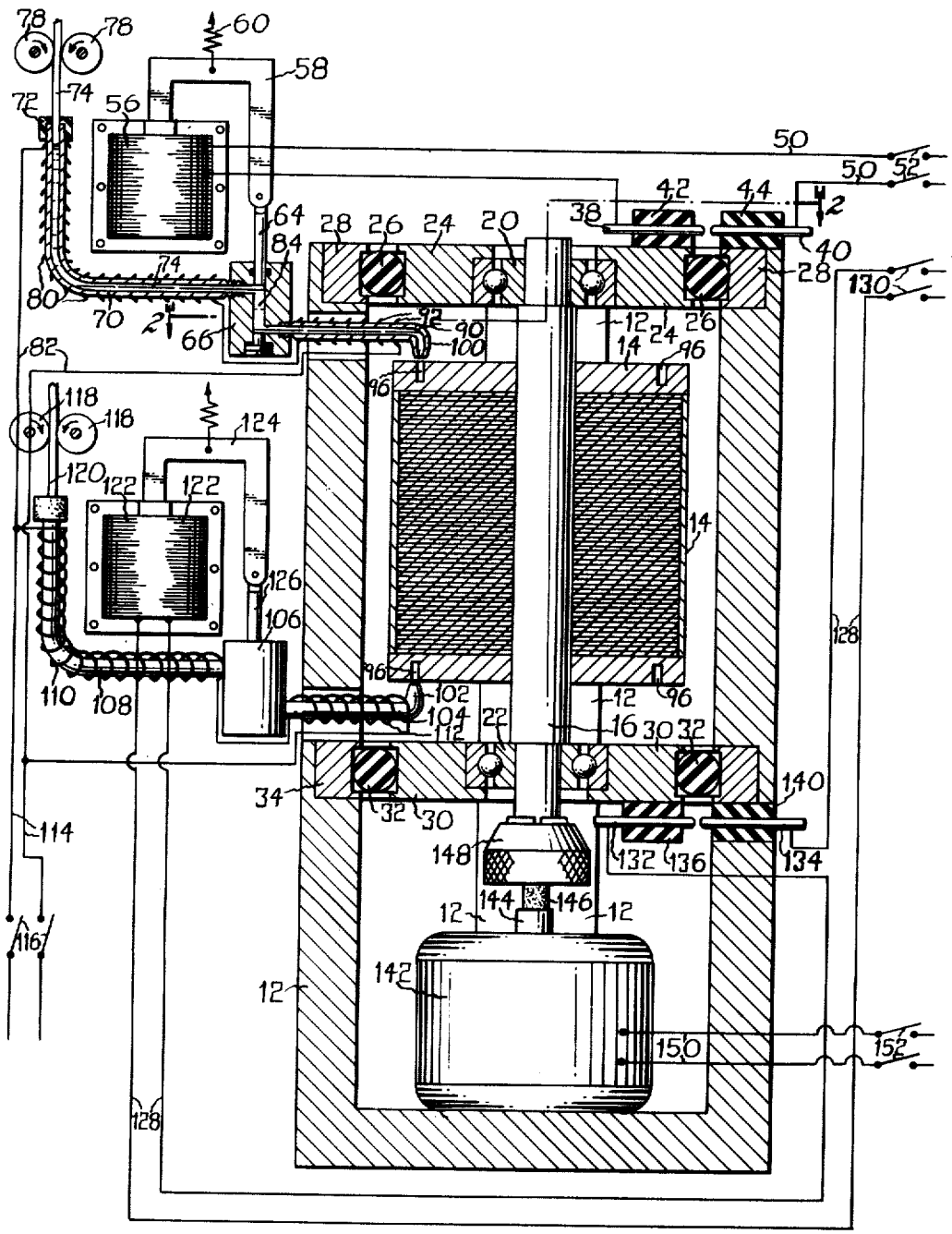
Figure 1 is a diagrammatic view, with parts shown in section, of a balancing apparatus of this invention.

Referring to the drawings in detail, balancing apparatus of this invention as shown in Figure 1 comprises support structure 12, which may be of any suitable size or shape. The support structure 12 may be adapted to support a member for rotation about a horizontal axis or vertical axis or about an axis in any other position. The support structure 12 is herein shown as adapted to rotatably carry a rotor member 14 provided with a shaft 16. The shaft 16 is journalled in any suitable antifriction bearings such as an upper bearing 20 and a lower bearing 22. The upper bearing 20 is retained within a holder 24. The holder 24 is carried by any suitable resilient means such as by means of a resilient ring 26 which is disposed between the holder 24 and a carrier 28. The carrier 28 is in direct supporting relation with the support structure 12.

The bearing 22 is suported in a like manner by means of a holder 30, a resilient ring 32 and a carrier 34. Thus, each of the bearings 20 and 22, supporting the shaft 16, may move laterally against the resilient forces of the rings 26 and 32, respectively.

Thus, the resilient rings 26 and 32 permit movement of the axis of rotation of the rotor 14 if the rotor 14 is sufficiently out of balance at any given speed of rotation.

Thus, it is understood that the holder 24 moves with the bearing 20 and the holder 30 moves with the bearing 22. Thus, the holder 24 moves with respect to the carrier 28 during movement of the bearing 20 and the holder 30 moves with respect to the carrier 34 during movement of the bearing 22.

Any suitable detector means is used to indicate movement of the bearings 20 and/or 22 with respect to the support structure 12. Herein the detector means comprises pairs of electric contact members. A contact member 38 is carried by a resilient insulator pad 42 which is attached to the holder 24. A contact 40 is carried by a resilient insulator pad 44 which is attached to the support structure 12 and/or to the carrier 28. The contacts 38 and 40 are attached to an electric circuit 50 which is energizable from any suitable source of electrical energy through a switch 52.

The circuit 50 also connects to any suitable actuator means. Herein the circuit 50 is shown as being connected to a solenoid 56 provided with an armature 58. The armature 58 is resiliently urged in a direction from the solenoid 56 by means of a spring 60. The armature 58 is connected to an ejector rod or piston 64 which is slidably movable within a housing 66.

Attached to the housing 66 and extending to the left and upwardly therefrom, as shown in Figure 1, is a tube 70. The upper end of the tube 70 is attached to a holder 72.

The tube 70 is adapted to carry any suitable material for providing weight to the rotor 14. Herein a rod 74 is shown, preferably of indefinite length, extending downwardly into the tube 70 at the upper end thereof. The rod 74 is preferably any material having a high specific gravity and which is easily fused and liquified. The material should also be one which readily adheres to a surface of a rotor. Such a material may comprise lead or plastics or the like.

The rod 74 is forced into the tube 70 by means of a pair of feeder wheels 78 which are rotated by any suitable means. The means for rotating the feeder wheels 78 may be directly associated with operation of the armature 58, if so desired.

Encircling the tube 70 is a heater coil 80 which is energized by conduit lines 82. The heater coil 80 provides sufficient heat to the tube 70 that the rod 74 is readily fused soon after entering the tube 70. Thus, the weight material 74 within the tube 70 becomes liquified and flows downwardly therewithin. The weight material 74 has greater flow characteristics as it moves toward the housing 66.

The housing 66 is shown as being provided with a passage 84 into which the weight material 74 flows as it leaves the tube 70. When the rod or piston 64 is moved downwardly by the armature 58 the fused material within the passage 84 is forced outwardly from the housing 66 and into a conduit 90. A heater coil 92 surrounds the conduit 90. The heater 92 is also energized by means of the circuit 82.

Figure 3:
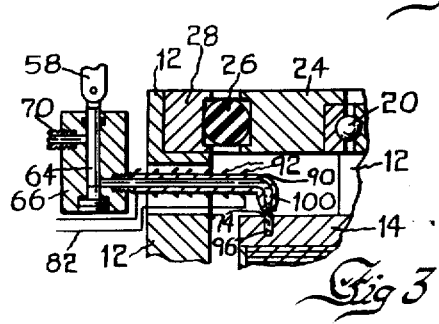
Figure 3 is a fragmentary view of portions of the apparatus as shown in Figure 1 and showing an ejector element in an actuated position.

As shown in Figure 1, the rotor 14 may be provided with an annular groove 96 at each end thereof for receipt of weight material. The conduit 90 has a discharge nozzle 100 disposed in close proximity and in alignment with the groove 96, as shown in Figures 1 and 3.

The groove 96 at the lower end of the rotor 14 is shown as having a portion thereof in direct alignment with a nozzle 102 of a conduit 104. The conduit 104 and nozzle 102 are elements of an assembly similar to that discussed above for injection of weight material into the groove 96. The conduit 104 is attached to a housing 106. The housing 106 has an incoming tube 108 similar to the tube 70 discussed above.

A heater element 110 encompasses the tube 108 and a heater element 112 encompasses the conduit 104. The heater elements 110 and 112 are energized by means of a circuit 114 which is connected to a switch 116.

A pair of feed wheels 118 are similar to the feed wheels 78 and are used to force a fusible rod 120 into the tube 108.

A solenoid 122 has an armature 124 attached to an ejector rod 126 which is reciprocally movable within the housing 106. The solenoid 122 is connected to a circuit 128. The circuit 128 is energized by closing of a switch 130. Also, connected to the circuit 128 are electric contact members 132 and 134. The contact member 132 is carried by a resilient insulator pad 136 which is attached to the holder 30. The contact 134 is attached to a resilient insulator pad 140 which is carried by the support structure 12.

Thus, it is understood that movement of the bearing 22 causes movement of the contact 132 toward or away from the contact 134 in the manner discussed above with respect to the contacts 38 and 40.

A motor 142 is attached to the support structure 12 for rotation of the shaft 16 and the rotor 14 at any desired rate. The motor 142 is provided with a shaft 144. A resilient coupling 146 is attached to the shaft 144 and is also attached to a chuck or clamp 148 which grasps the shaft 16 for rotation thereof. The motor 142 is shown as being connected to a pair of lines 150 for energization thereof. The lines 150 are attached to a suitable switch 152.

Thus, it is understood that for the balancing operation the switches 52, 130, 116, and 152 are closed. Thus, the motor 142 through the resilient coupling 146 and the chuck 148 causes rotation of the shaft 16 and the rotor 14.

*Operation*

It is naturally understood that if the rotor 14 is not dynamically balanced, rotation of the rotor 14 above a given speed causes the rotor 14 to attempt to shift its axis of rotation. Thus, movement of the bearing 20 and/or 22 occurs. Such movement may be in a somewhat elliptical path. Such movement is caused by unbalanced weight portions within the rotor 14. If one portion of the rotor 14 is heavier than an opposite portion thereof, an unbalance exists and vibration and movement of the bearings 20 and/or 22 occurs. The axis of rotation of the rotor 14 tends to shift toward the heavier portion thereof. Thus, the outward movement of the bearing 20 and/or 22 follows the heavier portion of the rotor 14.

When the bearing 20 moves there is movement of the contact 38 with respect to the contact 40. Of course, the bearing 20 and the contact 38 move together and equally. Such movement of the contact 38 is with the movement of the heavier portion of the rotor 14 so that the heavier portion of the rotor 14 is approximately directly below the contact 38 when the contact 38 moves toward the contact 40.

Thus, in order to improve the dynamic balance of the rotor 14 weight should be added to a portion directly opposite the contact 38 at the instant that the contact 38 moves toward the contact 40.

Also, it would be possible to improve the balance of the rotor 14 if weight is removed from a portion directly below the contact 38 at the instant the contact 38 moves toward the contact 40.

Means are provided in this invention for carrying out such a procedure of adding weight or removing weight from the rotor at the proper instant and at the proper portion of the rotor 14 to improve the balance of the rotor during rotation thereof.

If the movement of the contact 38 is equal to or greater than the space between the contacts 38 and 40, the contact 38 moves into engagement with the contact 40. Such engagement of the contact 38 with the contact 40 is, of course, only instantaneous or momentary as the heavy portion of the rotor moves directly below or in substantial alignment with the contact 38.

If the amount of movement of the contact 38 is greater than the normal spacing between the contacts 38 and 40, the resilient pads 42 and 44 deform, permitting slight travel of the contact 40 and permitting over travel of the contact 38.

At the instant engagement between the contacts 38 and 40, the solenoid 56 is energized by the circuit 50, causing downward movement of the armature 58, thus causing operation of the piston 64. The piston 64 instantaneously ejects a quantity of the fused material 74 from the passage 84 into the conduit 90. Due to the fact that some of the weight material 74 is also disposed within the conduit 90, actuation of the piston 64 causes a high velocity momentary spray of the weight material 74 in the fluid state from the nozzle 100, as shown in Figure 3. This weight material is thus forced into the groove 96 of the rotor 14, as shown in Figure 3.

Due to the fact that the contacts 38 and 40 are in engagement only during the instant that the heavier portion of the rotor 14 is in substantial alignment with the contact 38, the proper position for a quantity of weight material is at a position diametrically opposite the contact 38 at the instant the contact 38 engages the contact 40. However, there is naturally a short period of time between the closing of the contacts 38 and 40 and the actual ejection of the spray from the nozzle 100 into the groove 96. However, even though this period of time is extremely short, the rotor 14 moves a given amount between the instant that the contacts 38 and 40 come into engagement and the instant of the ejection of the spray of weight material into the groove 96. This period of time, of course, depends upon the rate of rotation of the rotor 14 and also depends upon the time required for operation of the piston 64.

Figure 2:
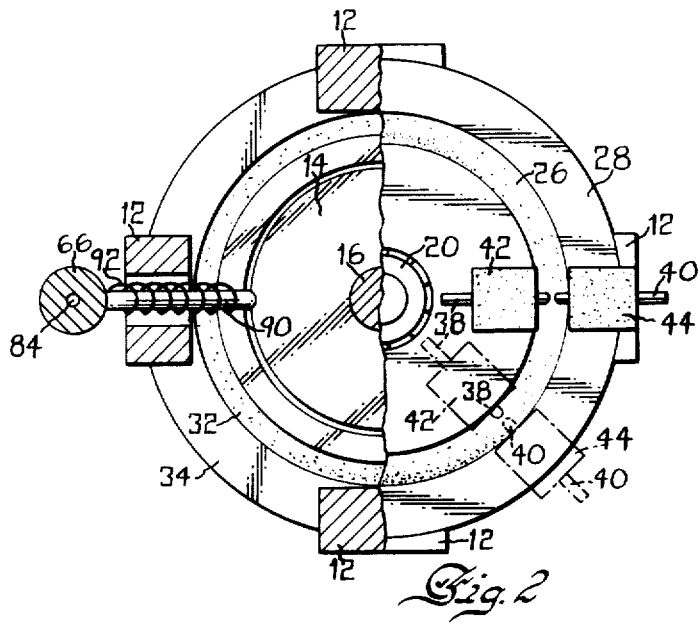
Figure 2 is a sectional view taken substantially on line 2—2 of Figure 1.

Therefore, means are provided for adjustment of the contacts 38 and 40 with respect to the nozzle 100. As shown in Figure 2, the contacts 38 and 40 with the pads 42 and 44 respectively are adjustable around the periphery of the rotor 14. This adjustment permits compensation for the time involved between the instant of engagement between the contacts 38 and 40 and the instant of ejection of spray of weight material 74 from the nozzle 100 into the groove 96. Thus, the ejection of weight material is always upon a portion of the rotor 14 which is substantially diametrically opposite the heavier portion. Thus, weight material is always added to the rotor 14 at a portion thereof which requires added weight in order to obtain better dynamic balance of the rotor 14.

Obviously, as the heavier portion of the rotor 14 carries the bearing 20 in outward movement, the contact 38 is caused to momentarily engage the contact 40 once during each revolution of the rotor 14. Thus, during each revolution of the rotor 14 in which the bearing 20 moves a distance equal to or greater than the normal distance between the contacts 38 and 40 an ejection of weight material upon the rotor 14 occurs. Thus, the rotor 14 is brought into better dynamic balance upon each revolution thereof.

Thus, it is understood that the degree of dynamic balance obtained is dependent upon the normal spacing between the contacts 38 and 40. This spacing between the contacts 38 and 40 may be readily and easily adjustable.

Due to the fact that, as shown in Figure 1, there may be at least one spray nozzle at each end of the rotor 14, weight may be added to either end or to both ends of the rotor 14 for balancing thereof during rotation thereof. As shown in Figure 1, the operation of the spray discharged from the nozzle 102 is controlled by the detector mechanism which comprises the contacts 132 and 134.

It is therefore readily understood that the balancing apparatus of this invention quickly and readily and automatically balances a rotor member during rotation thereof. Stopping of the rotor is not required for the proper adding of weight thereto. No manual operation is required for the balancing of a rotor by means of the apparatus of this invention.

As discussed with regard to Figure 1, a rotor 14 is shown which is provided with a groove 96 for receiving quantities of weight material forced therein by the spray mechanism. However, it is readily understood that it is not always necessary to have a retaining groove for the weight material which is ejected from a spray nozzle.

Figure 4:
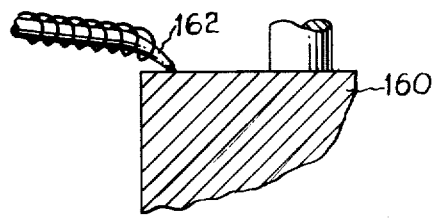
Figure 4 is a fragmentary view, with parts shown in section, of a modification of a portion of the balancing apparatus of this invention.

In Figure 4 a rotor 160 is shown being balanced by means of an apparatus of this invention which comprises a spray nozzle 162 which discharges a given amount of weight material directly upon a surface of the rotor 160 for balancing thereof. Any suitable weight material may be used which readily adheres to the surface of the rotor 160. It is also understood that various means may be used for causing a surface to be better adapted to receive a material for adherence to the surface. For example, the surface may be knurled or roughened in any suitable manner so that the surface will more readily retain the weight fluid which is sprayed thereon, as shown in Figures 1, 2, 3, and 4.

Figure 5:
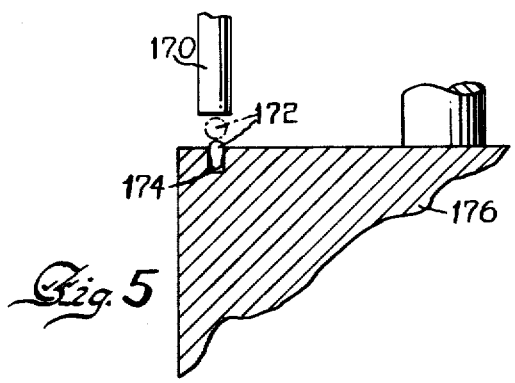
Figure 5 is a fragmentary view, with parts shown in section, of another modification of a portion of a balancing apparatus of this invention.

Figure 5 shows a modification of a weight ejecting mechanism in a balancing apparatus of this invention. In Figure 5 a gun 170 is shown for ejecting a body 172 into a groove 174 of a rotor 176 for balancing thereof. Of course, the gun 170 is so controlled by any suitable detector mechanism that the body 172 is discharged from the gun 170 at the proper instant to add weight to the rotor 176 at a portion of the rotor 176 which is lighter than a substantially opposite portion thereof, as described with respect to Figures 1 and 2.

Figure 6 shows a rotor mechanism 180 in the form of a fan or propeller which is balanced by a balancing apparatus of this invention. A spray nozzle 182, provided with a heater coil 184, discharges a quantity of weight material upon a blade of the rotor 180 at the proper position as detected by any suitable detector mechanism as described with respect to Figure 1.

Figure 7 shows a modification of a balancing apparatus of this invention. In Figure 7 a rotor 190 is shown which is supported by bearings 192 and 194. The bearings 192 and 194 are resiliently permitted to laterally move as the bearings 192 and 194 are carried by resilient members 196 which may be similar to the resilient members 26 and 32 discussed above.

Contact members 198 are shown at one end of the rotor 190 and contact members 200 are shown at the other end of the rotor 190. The contact members 200 and/or 198 come into engagement one with the other at the instant that a heavier portion of the rotor 190 is in alignment therewith. The contact members 198 and 200 serve as detector means for controlling ejection of a discharge of cutter material 201, such as a sand blast or the like, which travels with such velocity and has such cutting characteristics that a portion of the rotor 190 is removed at each actuation of the contacts 198 or 200. In Figure 7 nozzle means 202 and 204 serve to eject the discharge of cutting material 201. Any suitable control means may be used to actuate the nozzle means 202 and 204. The control means is actuated by the contacts 198 and/or 200. In Figure 7 the contact members 198 are shown in engagement one with the other, thus causing a momentary blast of cutter material 201 from the nozzle 202 thus causing cutting and removing of a portion of the surface of the rotor 190. The portion of the surface removed is from a heavier portion of the rotor 190 which is aligned with the contacts 198 when the contacts 198 engage. Of course, the contacts 198 and 200 may be adjusted around the periphery of the rotor 190 in a manner shown in Figure 2 with regard to the contacts 38 and 40 to compensate for time delays involved for operation of the weight changer devices.

It is to be understood that the cutting operation as shown in Figure 7 may occur during several revolutions of the rotor 190 as the rotor 190 is brought closer into the desired degree of dynamic balance.

Figure 8 shows another modification of a weight changer mechanism in a balancing apparatus of this invention. In Figure 8 a rotor or rotating mass 210 is balanced during rotation thereof. A rotating cutting wheel 212 is rotated by any suitable means at a high rate of speed at all times during the balancing operation. The cutter wheel 212 engages the surface of the rotor 210 only when actuated by a reciprocally operating mechanism 214 which is actuated by any suitable detector means which detects lateral movement of the rotor 210. Thus, the cutter wheel 212 is caused to momentarily engage the revolving rotor 210 at the proper portion of the rotor 210 to reduce the weight of that portion of the rotor 210 to bring the rotor 210 within a certain degree of dynamic balance.

In Figure 8 a modification of a detector means of this invention is shown.

A rotor 220, rotated by any suitable means, is resiliently retained against lateral movement by means of a resilient member 222. The resilient member 222 is disposed between a holder 224 and a carrier 226. The carrier 226 is in supporting engagement with the support structure 227. The holder 224 firmly retains an antifriction bearing 228 which rotatably carries a shaft 229 of the rotor 220.

A bracket 230 is attached to the holder 224 and extends laterally over the support structure 227 and to the side thereof. The bracket 230 is provided with an aperture 232. The aperture 232 is partially and adjustably closed by plates 234 retained by screws 236.

A bracket 240 is attached to the support structure 227 and extends laterally therefrom and to a position over the bracket 230. Adjacent the end of the bracket 240 and in alignment with the aperture 232 is secured a light source 246 energized through conductors 248. A housing 250 of the light source 246 is provided with a slot 254. Thus, a light beam 256 of the light source 246 is directed through the slot 254. The light beam 256 normally extends between the plates 234 and through the aperture 232 of the bracket 230.

A photocell 260 is attached to the bracket 240 in alignment with the aperture 232. The photocell 260 has a slot 262 for passage of the light beam 256 therethrough. Control leads 264 extend from the photocell 260 to any suitable actuator means for controlling weight change of the rotor 220.

Due to the fact that the bracket 230 is attached to the holder 224, the bracket 230 moves with lateral movement of the bearing 228. Thus, the bracket 230 is movable with respect to the support structure 227, such movement being against the resilient forces of the resilient member 222.

If the bracket 230 moves a sufficient amount, the light beam 256 is interrupted by a plate 234 attached to the bracket 230. Thus, the photocell 260 is deenergized. Deenergization of the photocell 260, through the control leads 240 causes actuation of any suitable actuator means for causing weight change to a portion of the rotor 220 by any suitable weight changer means for balancing the rotor 220 during rotation thereof.

Thus, it is understood that the plates 234 determine the amount of movement of the bearing 228 before actuation of a weight changer means. Thus, the degree of balance of the rotor 220 obtained is controlled by adjustment of the plates 234.

It is also to be understood that a rotating member revolving at an extremely high rate of speed may be balanced by any suitable weight changing means. It is sometimes necessary in the balancing of high speed members to control the weight changer means to operate only once every two or three revolutions of the rotor rather than upon each revolution of the rotor. Thus, sufficient time is provided between each operation of the weight changer means for reenergization thereof.

Thus, it is understood that a balancing apparatus of this invention provides means by which a rotating member is readily, easily, and automatically balanced to any desired degree while the member is rotating at any desired rate. No manual operation is required during the balancing procedure. Thus, the apparatus of this invention is particularly adapted for use in a production line operation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Automatic balancing apparatus for changing the balance of a rotatable member during rotation thereof at a given rate of rotation, means permitting small lateral movement of the member during rotation thereof, detector means indicating momentary lateral movement of the member above a given amount, weight changer means adjacent the member and operably connected to the detector means, the detector means controlling operation of the weight changer means causing momentary operation of the weight changer means at a moment that such lateral movement occurs, the weight changer means operating upon the member to change the weight of a portion thereof during rotation thereof, the weight changer means being located with respect to the detector means so that the weight changer means operates upon a portion of the member which requires a weight change to reduce the amount of such lateral movement of the member, the member thus being automatically brought closer into balance upon each operation of the detector means so that the amount of lateral movement is brought to a value less than the given amount during rotation thereof at the given rate of rotation.

2. Apparatus for automatically balancing a rotating member comprising support structure, resilient means carried by the support structure for resiliently permitting the rotating member to move laterally as a result of the unbalance thereof, detector means detecting lateral movement of the rotating member above a given amount, weight changing means carried by the support structure adjacent the rotating member, the weight changing means being operable upon the rotating member to change the weight of a portion of the rotating member during rotation thereof, means operably connecting the detector means and the weight changing means, the weight changing means automatically operating directly in response to the detector means changing the weight of a portion of the rotating member when there is lateral movement of the rotating member above the given amount.

3. Apparatus for balancing a rotatable member during rotation thereof comprising support structure, bearing means rotatably retaining said member, means for rotating said member, resilient means attaching the bearing means to the support structure, the resilient means permitting lateral movement of the bearing means toward and away from the support structure, weight material deposit means carried by the support structure for depositing weight material upon the rotatable member during rotation thereof, detector means instantaneously detecting a given amount of movement of the bearing means with respect to the support structure, the detector means being operably connected to the weight material deposit means, the detector means thus causing operation of the weight deposit means when a given amount of movement occurs between the support structure and the bearing means, the weight deposit means being located with respect to the detector means so that weight is deposited upon a portion of the member which requires increased weight in order to reduce the amount of such lateral movement, the weight material deposit means thus automatically instantaneously depositing material upon the rotatable member during a revolution thereof in which the relative movement between the bearing means and the support structure exceeds the given amount.

4. Apparatus for dynamically balancing a rotating member of the type having support structure, bearing means rotatably retaining said member, means for rotating said member, resilient means attaching the bearing means to the support structure, the resilient means permitting lateral movement of the bearing means toward and away from the support structure, the combination comprising switch means, the switch means having an electric contact carried by the bearing means and movable therewith, the switch means also having an electric contact carried by the support structure, the contacts normally being in spaced-apart relation, the contacts being momentarily engageable one with the other upon sufficient lateral movement of the bearing means, electric actuator means, electric circuit means connected to the contacts and to the actuator means for energization of the actuator means, the actuator means being operable upon engagement of the contacts, weight deposit means adjacent the rotating member operable to force a quantity of weight material upon the rotating member, the weight deposit means being operably connected to the actuator means, the weight deposit means thus operating only as a result of momentary engagement of the contacts, there being a small amount of weight deposited upon the member upon each actuation of the weight deposit means.

5. Balancing apparatus for a rotatable member of the type having support structure, means for rotating the member, resilient means attaching the rotating member to the support structure, the rotating member thus being permitted to move laterally during rotation thereof, unbalance of the rotating member causing lateral movement thereof, the combination comprising weight material deposit means carried by the support structure adjacent the rotatable member, the weight material deposit means including means for momentarily ejecting weight material at a high velocity, the weight material being directed upon a portion of the rotatable member, control means operable by lateral movement of the member during rotation thereof and connected to the weight material deposit means, weight material thus being automatically forced upon the member during rotation thereof directly in response to unbalance of the member.

6. In a machine for dynamically balancing a rotatable member during rotation thereof, means for rotating the member, means resiliently supporting the member and permitting lateral movement thereof during rotation thereof, detector means indicating momentary lateral movement of the member above a given value, cutter means adjacent the member and momentarily operable at a high rate of speed to remove a portion of the member during rotation thereof, and means operably connecting the detector means to the cutter means for controlling operation thereof so that the cutter means operates automatically to remove weight from the member as a result of an indication by the detector means of lateral movement in excess of the given value.

7. Balancing apparatus for balancing a rotating member during rotation thereof comprising means for resiliently permitting lateral movement of the member during rotation thereof, sensing means detecting momentary lateral movement of the member above a given amount, a cutter movably disposed adjacent the member and engageable therewith during rotation thereof, means operably connecting the sensing means to the cutter for movement of the cutter into engagement with the member, the sensing means thus directly causing actuation of the cutter to remove a small portion from the member by a series of momentary operations of the cutter during rotation of the member, the cutter automatically momentarily engaging the member upon a detection by the sensing means of the occurrence of said lateral movement.

8. Apparatus for balancing a rotating body, a pair of bearing members rotatably supporting the body, resilient means permitting lateral movement of each bearing member during rotation of the body, a detector member adjacent each of the bearing members indicating momentary lateral movement thereof, a plurality of weight changer members, there being at least one weight changer member controlled by each of the detector members, each weight changer member being automatically momentarily operable upon the rotating body to change the weight of a portion thereof during rotation thereof as a detector member indicates lateral movement of a bearing member.

9. Automatic apparatus for dynamically balancing a rotating member during rotation thereof comprising support structure, bearing means rotatably supporting the member, resilient means attaching the bearing means to the support structure, the resilient means permitting small lateral movement of the bearing means, detector means indicating momentary lateral movement of the bearing means above a given amount, a weight changer member adjacent the rotating member, control means connecting the weight changer member to the detector means, the weight changer member automatically operating upon the rotating member to change the weight of a portion thereof directly in response to an indication by the detector means of said lateral movement, the weight changer member changing the weight of a portion of the rotating member during rotation thereof so that the dynamic balance of the rotating member is changed during rotation thereof.

10. In combination with means for retaining a rotating mass, mechanism for adding weight to the rotating mass for dynamically balancing the mass during rotation thereof including a source of weight material in a fluid state, ejector means for momentarily ejecting a quantity of the weight material upon a portion of the rotating mass, control means adjacent the rotating mass and connected to the ejector means for controlling operation thereof, the control means indicating movement of the axis of rotation of the mass as a result of the unbalance thereof, the ejector means automatically operating directly in response to the control means to eject weight material upon a portion of the rotating mass for balancing thereof, the control means causing operation of the ejector means only during moments that the movement of the axis of rotation of the body exceeds a given amount.

11. Balancing apparatus for balancing a rotatable body during rotation thereof, the body being provided with a groove at the periphery thereof for the receipt of weight material, the combination comprising sensing means detecting lateral movement of the axis of rotation of the body in excess of a given amount, ejector means adjacent the body and in alingment with the groove thereof, the ejector means being adapted to discharge bodies of weight material into the groove, the ejector means discharging at least one body of weight material upon each actuation of the ejector means, means operably connecting the sensing means to the ejector means, the sensing means detecting the instant that a heavier portion of the body is disposed at a given position, the sensing means causing the ejector means to eject a body of weight material into the groove of the body at a portion thereof in spaced relation from said heavier portion of the body, when the lateral movement of the axis of rotation exceeds the given amount.

12. Apparatus for balancing a member during rotation thereof comprising sensing means detecting lateral movement of the axis of rotation of the member, the sensing means detecting the instant of time that a heavier portion of the member is disposed at a given position as a result of momentary lateral movement of the member, weight changer means, the weight changer means being momentarily operable directly upon a portion of the member to change the weight thereof during rotation thereof, and means operably connecting the weight changer means to the sensing means for actuation thereby so that the weight changer means automatically operates directly in response to the sensing means to slightly change the weight of the member only upon a detection by the sensing means of the occurrence of lateral movement of the member.

13. Balancing apparatus for changing the dynamic balance of a rotatable member during rotation thereof comprising photoelectric detector means indicating the lateral movement of the member in excess of a given amount during rotation thereof, weight changer means connected to the detector means for control thereby, the weight changer means being operable upon the member to change the weight of a portion thereof during rotation thereof when the lateral movement of the member is in excess of the given amount.

14. In mechanism for automatically balancing a rotating body, means permitting slight lateral movement of the body during rotation thereof, detector means indicating instantaneous lateral movement of the rotating body above a given amount, a weight changer member adjacent the body and operable thereupon to change the weight thereof, means directly connecting the weight changer member to the detector means, the weight changer member being momentarily operable upon the body to change the weight thereof at the moment that the detector means indicates lateral movement of the body above the given amount, the weight changer member thus operating only during moments in which there is lateral movement of the body above the given amount as indicated by the detector means, the body thus being automatically balanced during rotation thereof so that the lateral movement thereof is less than the given amount.

15. In mechanism for automatically balancing a rotating body, means permitting slight lateral movement of the body during rotation thereof, ejector means adjacent the body for momentarily discharging a small amount of weight material directly upon the body, detector means detecting instantaneous lateral movement of the body above a given amount, electrically operable means directly connected to the ejector means for operation thereof, the electrically operable means being directly connected to the detector means for operation thereby, the ejector means thus operating to eject a small amount of weight material upon the body during rotation thereof at a moment that the lateral movement of the body exceeds the given amount, the detector means and the ejector means being relatively located so that the ejector means discharges weight material upon the body at a portion thereof requiring addition of weight for balancing of the body.

16. In mechanism for automatically balancing a rotating body, detector means indicating instantaneous lateral movement of the body in excess of a given amount, an ejector, the ejector including a housing having a nozzle in juxtaposition with the body, the housing including an inlet tube which receives weight material in a solid state, heater means heating the tube and the nozzle, the heater means changing the weight material to a fluid state and maintaining the weight material in a fluid state, a reciprocally operable plunger within the housing instantaneously forcing the weight material from the housing and from the nozzle and onto the body, electrically operable means connected to the plunger for operation thereof, means connecting the electrically operable means to the detector means for instantaneous operation of the plunger at a moment when the detector means indicates lateral movement of the body above the given amount.

17. Apparatus for automatically balancing a rotating body comprising support structure, means permitting lateral movement of the body during rotation thereof, an electric contact member firmly attached to the support structure, an electric contact member movable with lateral movement of the rotating body, the contact members being engageable one with the other upon lateral movement of the body in excess of a given amount during rotation thereof, a weight changer member adjacent the body and operable thereupon to change the weight thereof, electrical means connected to the weight changer member for operation thereof, the electrical means being directly electrically connected to the contact members so that the weight changer member is operated and changes the weight of the body only at a moment that the contact members are in engagement during rotation of the body.

18. In apparatus for automatically balancing a body during rotation thereof, a weight discharge member adjacent the body, the weight discharge member including a housing having a passage therethrough, an inlet tube connected to the housing and joining one end of the passage, means forcing weight material in a solid state into the tube at the end thereof opposite the housing, heater means heating the tube so that weight material therein is changed from a solid state to a fluid state so that weight material in a fluid state moves into the passage of the housing, a discharge tube connected to the housing and joining the passage thereof at the opposite end thereof from the inlet tube, a piston reciprocally movable within the passage for discharge of weight material therefrom and into the discharge tube, weight material in the fluid state thus being discharged from the discharge tube upon the body upon each discharge operation of the piston, and means connected to the piston and operable in response to lateral movement of the body causing discharge operation of the piston at a moment that there is lateral movement of the body in excess of a given amount.

19. In apparatus for automatically balancing a rotating body having an annular groove therein, a gun adjacent the groove, the gun having means for shooting a ball of weight material into the groove, and means connected to the gun and responsive to lateral movement of the body for causing the gun to shoot a ball therefrom into the groove of the body at each instant that there is lateral movement of the body in excess of a given amount, the weight of the body thus being slightly increased at a moment that such lateral movement occurs.

20. In apparatus for automatically balancing a body during rotation thereof, a gun adjacent the body for discharging cutting material thereupon, the gun being capable of blasting a small quantity of cutting material instantaneously and momentarily upon the rotating body, and means connected to the gun and responsive to lateral movement of the body for causing the gun to blast a small quantity of cutting material upon the body at a moment that there is lateral movement of the body in excess of a given amount, the weight of the body thus being reduced slightly at each instant that such lateral movement occurs.

21. In apparatus for automatically balancing a body during rotation thereof, a weight discharge member adjacent the body, the weight discharge member including a housing having a passage therethrough, an inlet tube connected to the housing and joining one end of the passage, means forcing weight material into the tube at the end thereof opposite the housing, the weight material moving into the passage of the housing, a discharge tube connected to the housing and joining the passage thereof at the opposite end thereof from the inlet tube, a piston reciprocally movable within the passage for discharge of weight material therefrom and into the discharge tube, weight material thus being discharged from the discharge tube upon the body upon each discharge operation of the piston, and means connected to the piston and operable in response to lateral movement of the body causing discharge operation of the piston at a moment that there is lateral movement of the body in excess of a given amount.

References Cited in the file of this patent

UNITED STATES PATENTS

| | | |
|---|---|---|
| 2,327,608 | Saltz | Aug. 24, 1943 |
| 2,373,638 | Perkins | Apr. 10, 1945 |
| 2,432,659 | Criswell | Dec. 16, 1947 |
| 2,731,887 | Sjostrand | Jan. 24, 1956 |
| 2,754,795 | Enssle | July 17, 1956 |

FOREIGN PATENTS

| | | |
|---|---|---|
| 637,177 | Great Britain | May 17, 1950 |